US009693657B2

(12) United States Patent
Naden et al.

(10) Patent No.: US 9,693,657 B2
(45) Date of Patent: Jul. 4, 2017

(54) SPICE MILL

(71) Applicant: Helen of Troy Limited, Belleville, St. Michael (BB)

(72) Inventors: Mark Cameron Naden, New York, NY (US); Boris Kontorovich, Brooklyn, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 356 days.

(21) Appl. No.: 14/602,938

(22) Filed: Jan. 22, 2015

(65) Prior Publication Data

US 2016/0220068 A1     Aug. 4, 2016

(51) Int. Cl.
*A47J 42/46*     (2006.01)

(52) U.S. Cl.
CPC ..................... *A47J 42/46* (2013.01)

(58) Field of Classification Search
CPC .......................................... A47J 42/46
USPC ........................................ 241/169.1
See application file for complete search history.

(56) References Cited

U.S. PATENT DOCUMENTS

| 3,827,641 A | 8/1974 | Andersson |
| 4,844,352 A | 7/1989 | Griffin |
| 4,925,150 A | 5/1990 | Tedioli |
| 6,962,302 B2 | 11/2005 | Cheng |
| 7,975,946 B2 | 7/2011 | Bodum |
| 8,622,329 B1 | 1/2014 | Jones |
| 2009/0314867 A1 | 12/2009 | Bodum |
| 2012/0241543 A1 | 9/2012 | Tang |
| 2013/0193246 A1 | 8/2013 | Roberts, Jr. |
| 2015/0297033 A1 | 10/2015 | Wong |

OTHER PUBLICATIONS

International Search Report filed in PCT/US2016/012847 mailed Apr. 28, 2016.

*Primary Examiner* — Mark Rosenbaum
(74) *Attorney, Agent, or Firm* — Rankin, Hill & Clark LLP

(57) ABSTRACT

A spice mill includes a gear mechanism operable in a first operational state wherein the gear mechanism is coupled to a first grinding mechanism and a second operational state wherein the gear mechanism is coupled to a second grinding mechanism. A selector connected to the gear mechanism is movable between a first position and a second position. In the first position the gear mechanism is operable in the first operational state and in the second position the gear mechanism is operable in the second operational state. A cover part is rotatably mounted to the body and connected to the gear mechanism. Rotation of the cover part in a first direction rotates the first grinding mechanism when the gear mechanism is in the first operational state and rotation of the cover part in the first direction rotates the second grinding mechanism when the gear mechanism is in the second operational state.

19 Claims, 15 Drawing Sheets

SPICE MILL

BACKGROUND

A known spice mill has two separate spice containers which can receive different spices, for example peppercorns and salt crystals. A grinding mechanism is provided at the bottom of each spice container to crush the spices. Each grinding mechanism is operably connected to a gear mechanism via a shaft having a gear wheel. One known gear mechanism includes a pivotable gear wheel which enters into engagement with the gear wheel on one shaft when the gear mechanism is driven in one direction and enters into engagement with the gear wheel of the other shaft when the gear mechanism is driven in the opposite direction. The containers are upwardly sealed by a covering which can be opened in order to add spices to the spice containers. Located above and separate from the covering is a rotary handle which can be rotated manually and drives the gear mechanism via a central shaft extending through the covering.

BRIEF DESCRIPTION

In accordance with one aspect, a spice mill for crushing two different spices comprises a body defining a first container and a separate second container. A first grinding mechanism is housed in the body and arranged at a lower end of the first container. A second grinding mechanism is housed in the body and arranged at a lower end of the second container. A drive assembly is housed in the body and includes a gear mechanism selectively operable in one of a first operational state wherein the gear mechanism drives the first grinding mechanism and a second operational state wherein the gear mechanism drives the second grinding mechanism. A selector is connected to the gear mechanism and is movable between a first position and a second position. In the first position of the selector the gear mechanism is operable in the first operational state and in the second position of the selector the gear mechanism is operable in the second operational state. A cover part is rotatably mounted to the body and connected to the gear mechanism. Rotation of the cover part in a first direction rotates the first grinding mechanism when the gear mechanism is in the first operational state and rotation of the cover part in the first direction rotates the second grinding mechanism when the gear mechanism is in the second operational state.

In accordance with another aspect, a spice mill for crushing two different spices comprises a body including a partition for separating a part of the body into a first container and a separate second container. A first grinding mechanism is housed in the body and arranged at a lower end of the first container. The first grinding mechanism has a first grinder shaft. A second grinding mechanism is housed in the body and arranged at a lower end of the second container. The second grinding mechanism has a second grinder shaft. A drive assembly is housed in the body and includes a clutch mechanism and a gear mechanism. The clutch mechanism has a first clutch connected to the first grinder shaft and a second clutch connected to the second grinder shaft. The gear mechanism is housed in the body and includes a first gear, a second gear, and a drive gear which at all times is operably engaged to both the first gear and second gear. The gear mechanism is selectively operable in one of a first operational state wherein the first clutch is engaged to first gear for actuation of the first grinding mechanism and a second operational state wherein the second clutch is engaged to the second gear for actuation of the second grinding mechanism.

In accordance with yet another aspect, a drive assembly for a spice mill is provided. The spice mill has a first grinding mechanism for crushing a first spice contained in a first container of the spice mill and a second grinding mechanism for crushing a second spice contained in a second separate container of the spice mill. The drive assembly comprises a clutch mechanism including a first clutch having an opening therethrough for slidably receiving a first grinder shaft of the first grinding mechanism and a second clutch having an opening therethrough for slidably receiving a second grinder shaft of the second grinding mechanism. A gear mechanism includes a first gear, a second gear, and a drive gear which at all times is operably engaged to both the first gear and second gear so that rotation of the drive gear simultaneously rotates both the first gear and the second gear. The gear mechanism is selectively operable in one of a first operational state wherein the first clutch is engaged to first gear so that rotation of the drive gear only actuates the first grinding mechanism and a second operational state wherein the second clutch is engaged to the second gear so that rotation of the drive gear only actuates the second grinding mechanism.

DETAILED DESCRIPTION

It should, of course, be understood that the description and drawings herein are merely illustrative and that various modifications and changes can be made in the structures disclosed without departing from the present disclosure. In general, the figures of the exemplary spice mill are not to scale It will also be appreciated that the various identified components of the exemplary spice mill disclosed herein are merely terms of art that may vary from one manufacturer to another and should not be deemed to limit the present disclosure.

Figure 1:
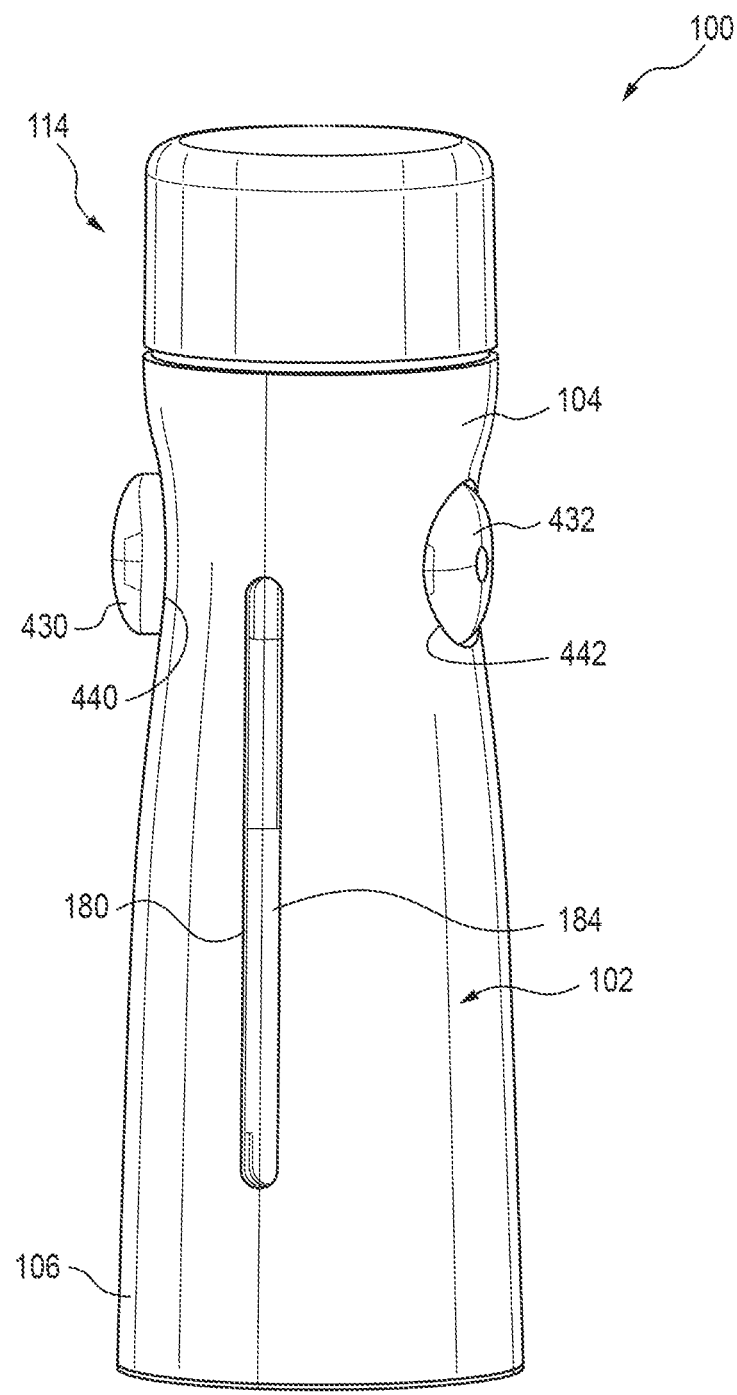
FIG. 1 is a perspective view of a spice mill according to the present disclosure.
Figure 2:
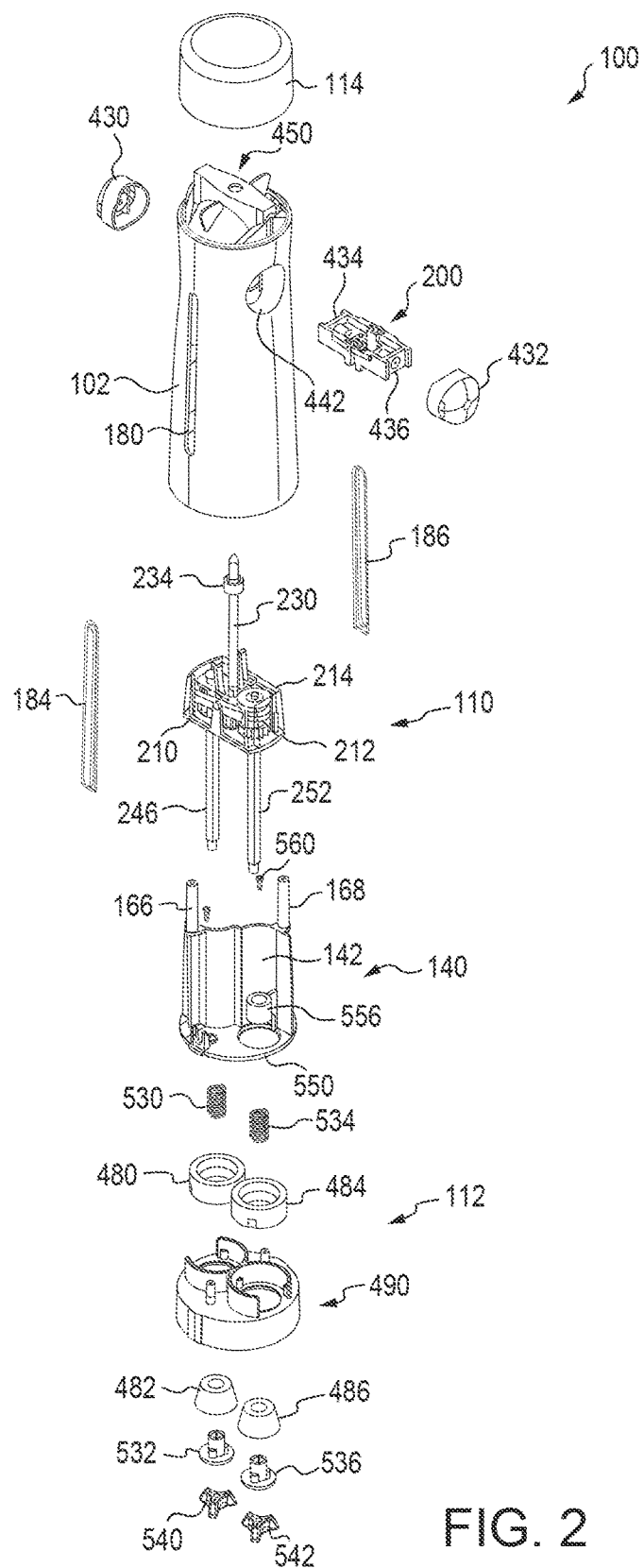
FIG. 2 is an exploded view of the spice mill shown in FIG. 1.

Referring now to the drawings, wherein like numerals refer to like parts throughout the several views, FIGS. 1 and 2 illustrate an exemplary spice mill 100 for crushing two different spices. The spice mill 100 includes a body 102 having a first or upper end portion 104 and a second or lower end portion 106 (as the spice mill 100 is oriented in the figures). The body 102 houses a drive assembly 110 and a grinding assembly 112 operably connected to the drive assembly. A cover part or knob 114 is rotatably and removably connected to the upper end portion 104 of the body 102 and is operably connected to the drive assembly so that rotation of the cover part 114 actuates the drive assembly 110, which, in turn, actuates the grinding assembly 112.

Figure 3:
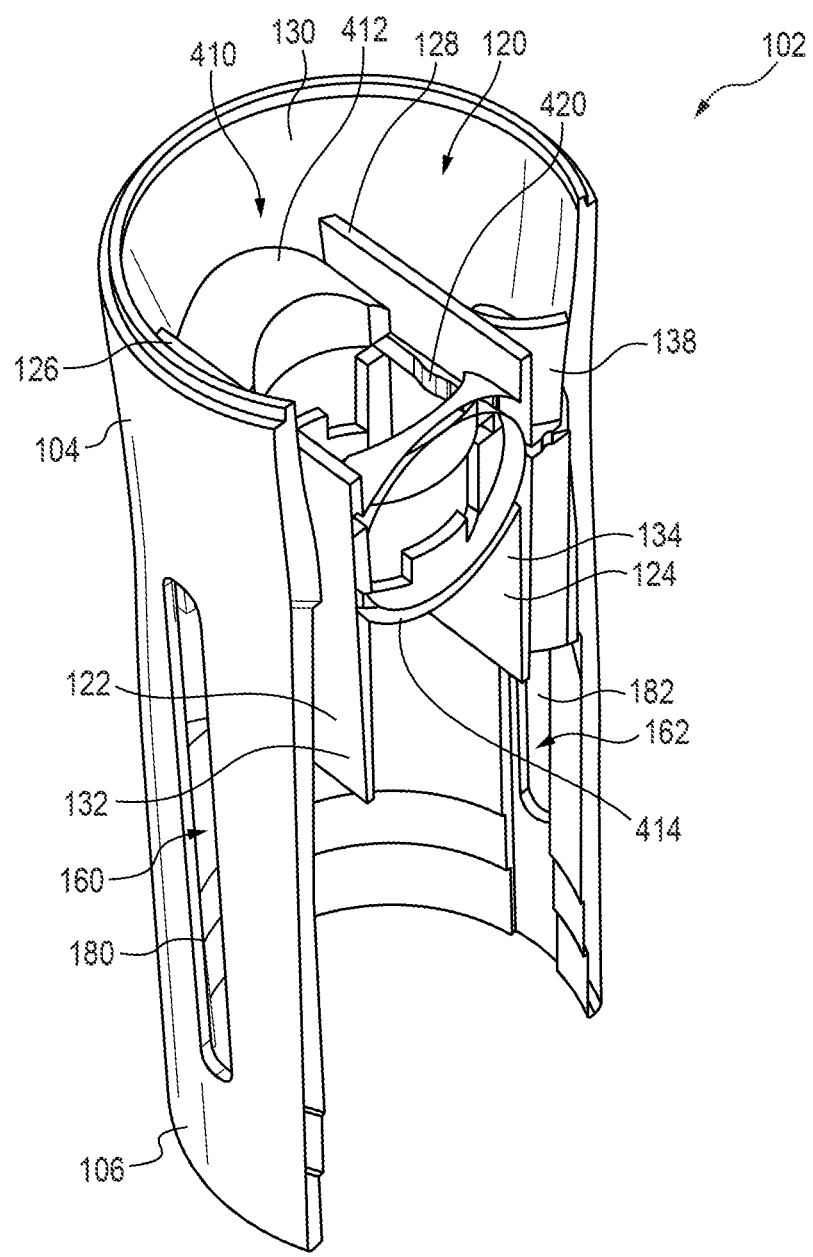
FIG. 3 is a perspective view, partially broken away, of a body of the spice mill of FIG. 1.
Figure 13:
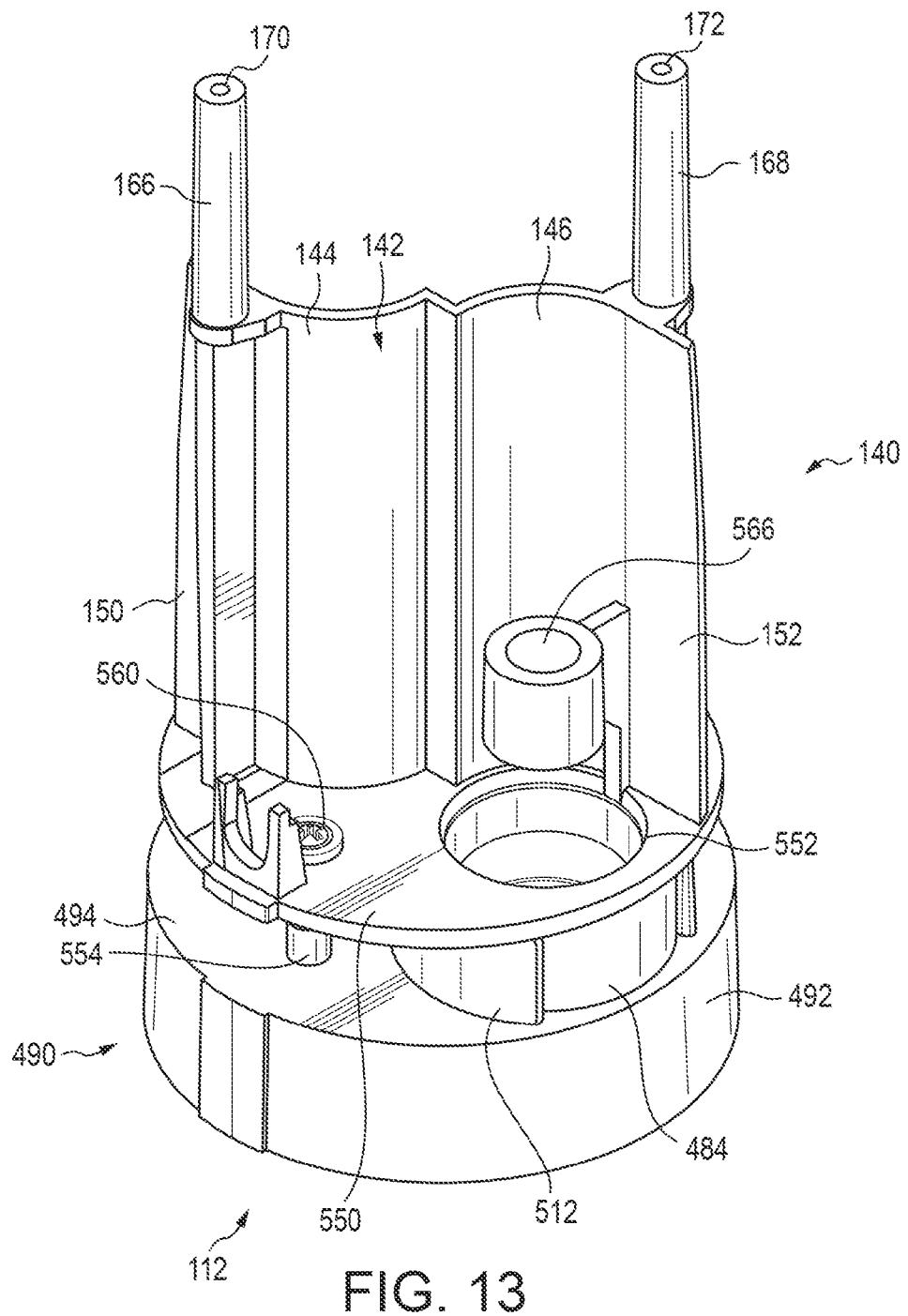
FIG. 13 is a perspective view of a partition and the grinding assembly of the exemplary spice mill.

With additional reference to FIG. 3, the body 102 includes an inner part 120 located adjacent the upper end portion 104. The inner part 120 includes a first wall 122 and a second wall 124 spaced apart from the first wall 122. Each of the first wall 122 and second wall 124 has at least one side 126, 128 in contact with an inner surface 130 of the body 102. Located adjacent an opposite side 132, 134 of each respective first wall 122 and second wall 124 is an extension (only extension 138 of second wall 124 is shown in FIG. 3) which contacts the inner surface 130. The first and second walls 122, 124 further contact a partition 140 housed in the lower end portion 106 of the body 102. As best depicted in FIG. 13, the partition 140 includes a dividing wall 142 having a first part 144 and a second part 146. The first part 144 of the dividing wall can be curved in a first direction and has an end 150 end abutting the inner surface 130 of the body 102. The second part 146 of the dividing wall 142 can be curved in an opposite second direction and has an end 152 also abutting the inner surface 130 of the body 102. When secured in the body 102, the first part 144 of the dividing wall 142 cooperates with the first wall 122 to define a first spice container 160 within the body 102 and the second part 146 of the dividing wall 142 cooperates with the second wall 124 to define a separate second spice container 162 in the body. As depicted, the second container 162 is located next to the first container 160 such that a longitudinal axis defined by the second container is offset from and parallel to a longitudinal axis defined by the first container 160. To mount the partition 140 within the body 102, the partition is provided with a pair of bosses 166, 168 having mounting holes 170, 172, respectively. The bosses 166, 168 engage the inner part 120 and fasteners (not shown) extend through mounting openings (not shown) provided on the inner part 120 and threadingly engage the mounting holes 170, 172 on the bosses 166, 168. To provide a visual indication as to an amount of spice located in each of the first container 160 and second container 162, the body 102 is provided with a pair of spaced elongated slots 180, 182 for receiving transparent inserts 184, 186, respectively.

Figure 4:
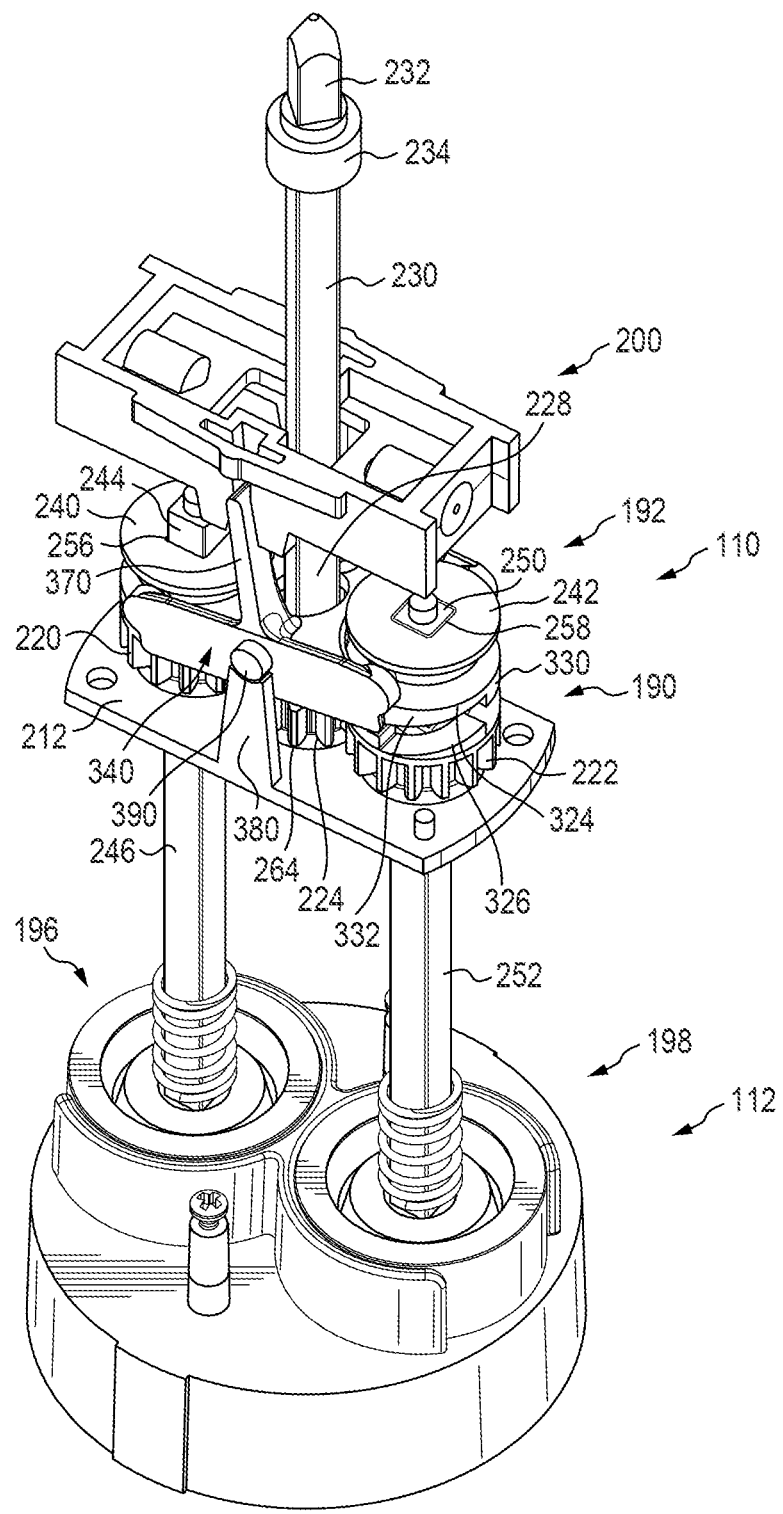
FIG. 4 is a perspective view of a drive assembly and a grinding assembly of the spice mill of FIG. 1.
Figure 5:
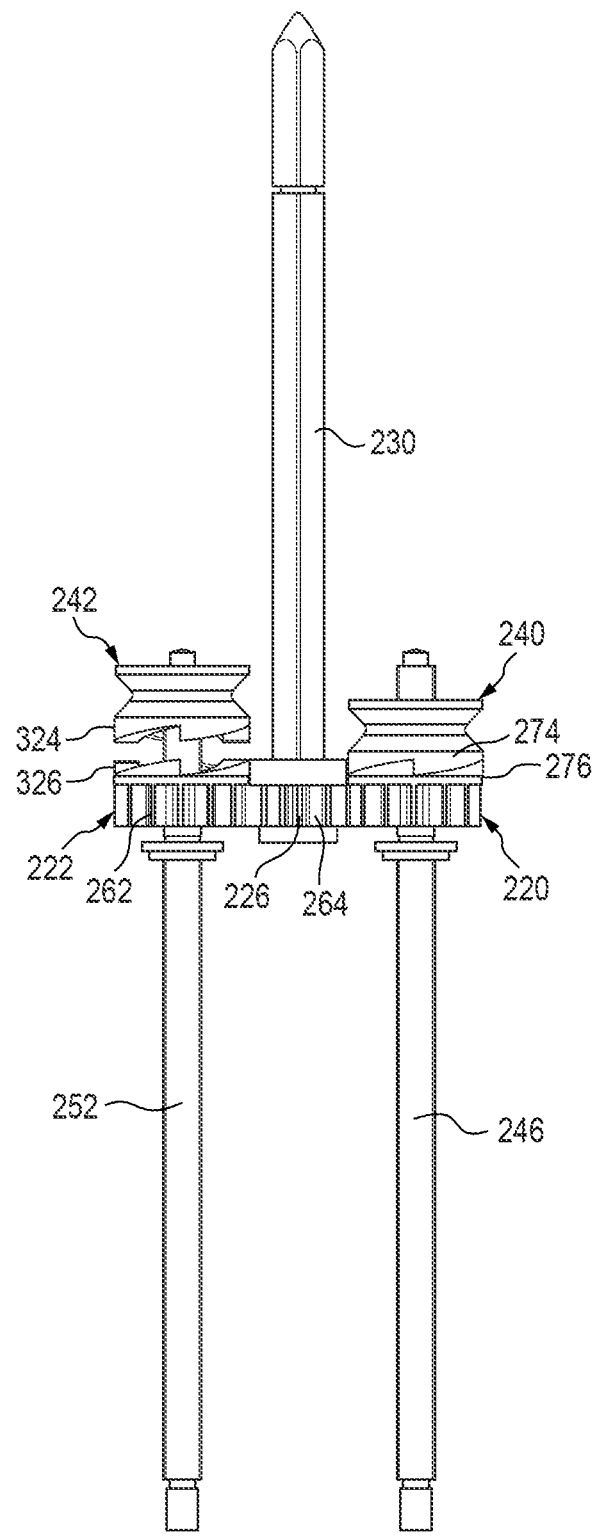
FIG. 5 is an elevation view of a clutch mechanism and gear mechanism of the drive assembly of FIG. 4.
Figure 6:
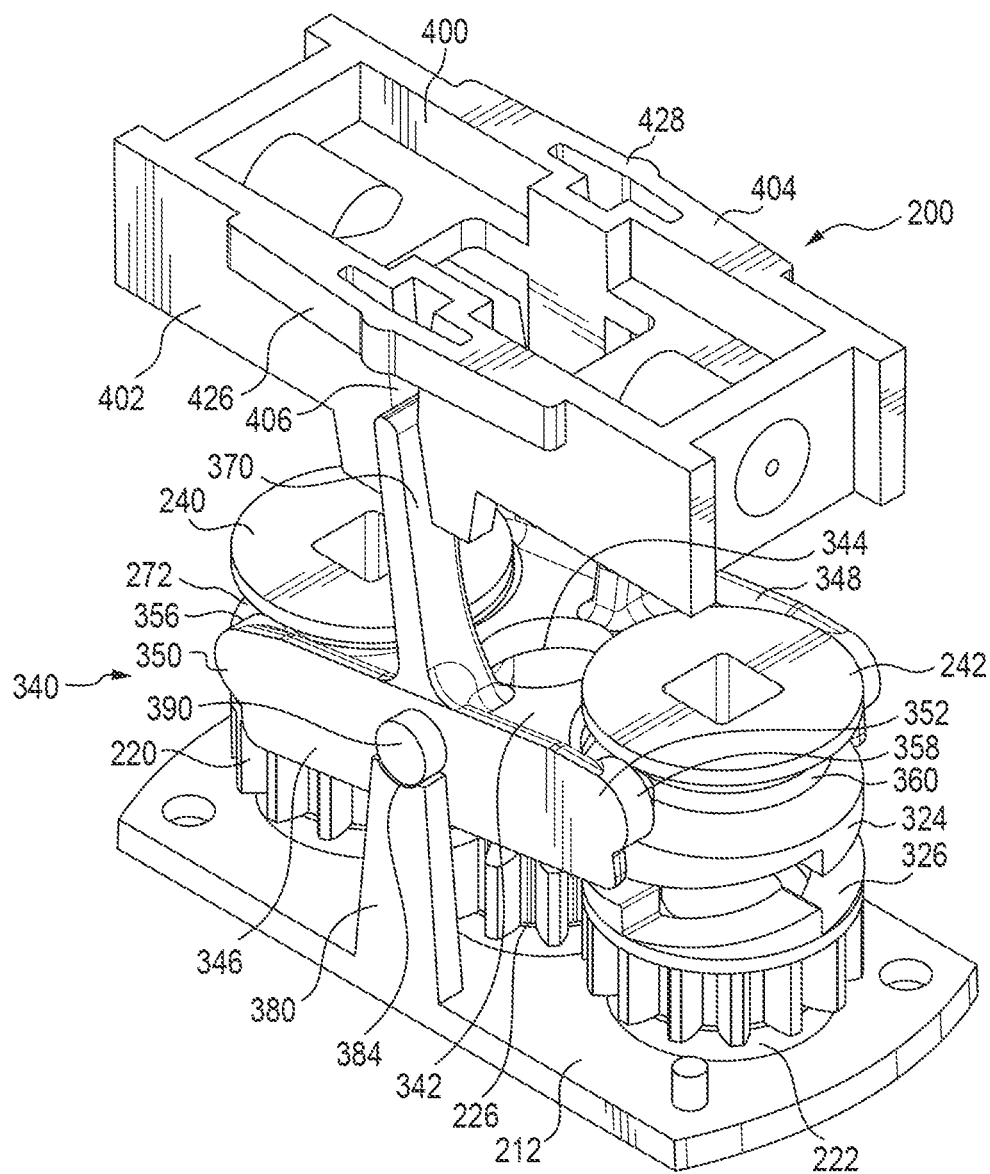
FIGS. 6 and 7 are perspective views of the clutch mechanism, drive mechanism and a selector of the drive assembly of FIG. 4.
Figure 7:
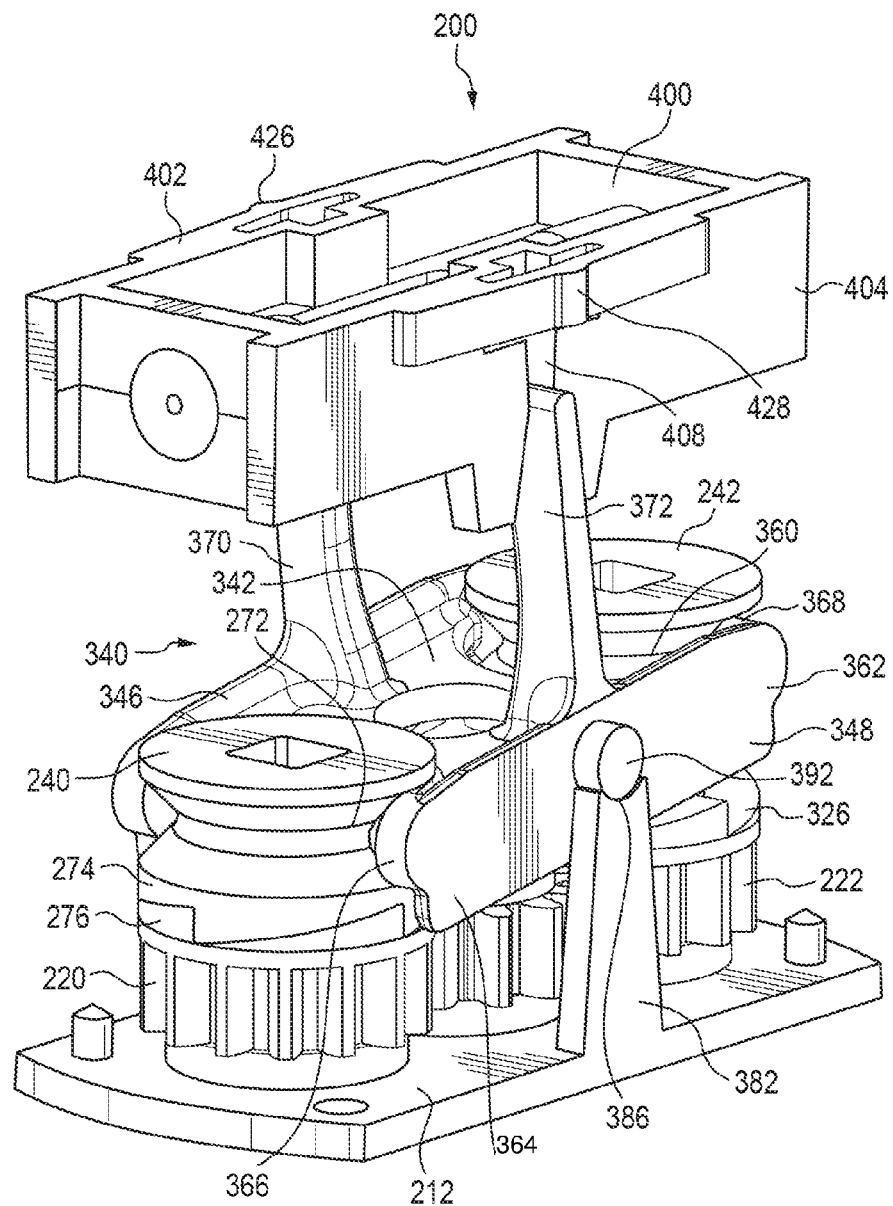

As shown in FIGS. 4-7, the drive assembly 110, which is arranged at or above an upper open end of the first and second containers 160, 162, includes a gear mechanism 190 and a clutch mechanism 192. The grinding assembly 112 includes a first grinding mechanism 196 arranged at a lower end of the first spice container 160 and a second grinding mechanism 198 arranged at a lower end of the second spice container 162. As will be discussed in greater detail below, the gear mechanism 190 is selectively operable in a first operational state wherein the gear mechanism 190 is coupled to the first grinding mechanism 196 for grinding the spice located in the first container 160. In the first operational state, the gear mechanism 190 drives the first grinding mechanism 196, but the second grinding mechanism 198 is not driven. According to one aspect, the gear mechanism 190 is only coupled to the first grinding mechanism 196 in the first operational state. The gear mechanism is also selectively operable in a second operational state wherein the gear mechanism 190 is coupled to the second grinding mechanism 198 for grinding the spice located in the second container 162. In the second operational state, the gear mechanism 190 drives the second grinding mechanism 198, but the first grinding mechanism 196 is not driven. According to one aspect, the gear mechanism 190 is only coupled to the second grinding mechanism 198 in the second operational state. Further depicted in FIG. 4 is a selector 200 connected to the gear mechanism 190. The selector 200 is movable between a first position and a second position. In the illustrated embodiment, the selector translates, or slides, between the first position and the second position. In the first position of the selector 200 the gear mechanism 190 is operable in the first operational state. In the second position of the selector 200 the gear mechanism 190 is operable in the second operational state.

With reference back to FIG. 2, the gear mechanism 190 is provided in a housing 210 having a lower housing part 212 and an upper housing part 214. The housing 210 is positioned between the first and second walls 122, 124 of the inner part 120 and the lower housing part 212 contacts the dividing wall 142. Therefore, with this arrangement, the drive assembly 110 is isolated from the spices held in the first and second containers 160, 162. The gear mechanism 190 includes a first gear 220, a second gear 222 and a drive gear 224 which at all times is operatively engaged to both the first gear 220 and the second gear 222. Each of the first gear 220, second gear 222, and drive gear 224 is rotatably supported on the lower housing part 212. The drive gear 224 is mounted to a first end portion 228 of a main drive shaft 230. A second end portion 232 of the main drive shaft 230 is provided with a bushing 234 which facilitates the connection of the main drive shaft 230 to the cover part or knob 114. With the cover part 114 attached to the second end portion 232 of the main drive shaft 230, rotation of the cover part 114 in either a first direction or a second opposite direction rotates the drive gear 224 which, in turn, simultaneously rotates the first gear 220 and the second gear 222.

The clutch mechanism 192 of the drive assembly 110 includes a first clutch 240 and a second clutch 242. The first clutch 240 is connected to a first end portion 244 of a first grinder shaft 246 of the first grinding mechanism 196. The second clutch 242 is connected to a first end portion 250 of a second grinder shaft 252 of the second grinding mechanism 198. In the depicted embodiment, each of the first and second grinder shafts 246, 252 are polygonal shaped in cross section (e.g., square shaped in cross section) and each of the first clutch 240 and second clutch 242 includes a correspondingly shaped opening 256, 258, respectively, for receiving the first end portion 244, 250 of the first and second grinder shaft 246, 252. It should be appreciated that the configuration of the first and second grinder shafts 246, 252 and the corresponding openings 256, 258 of the first and second clutches 240, 242 ensures that selective rotation of one of the first and second clutches 240, 242 rotates its corresponding first and second grinder shafts 246, 252. The first and second clutches 240, 242 also slide along (in a vertical direction per the orientation shown in FIG. 4) the respective first and second grinder shafts 246, 252.

Figure 8:
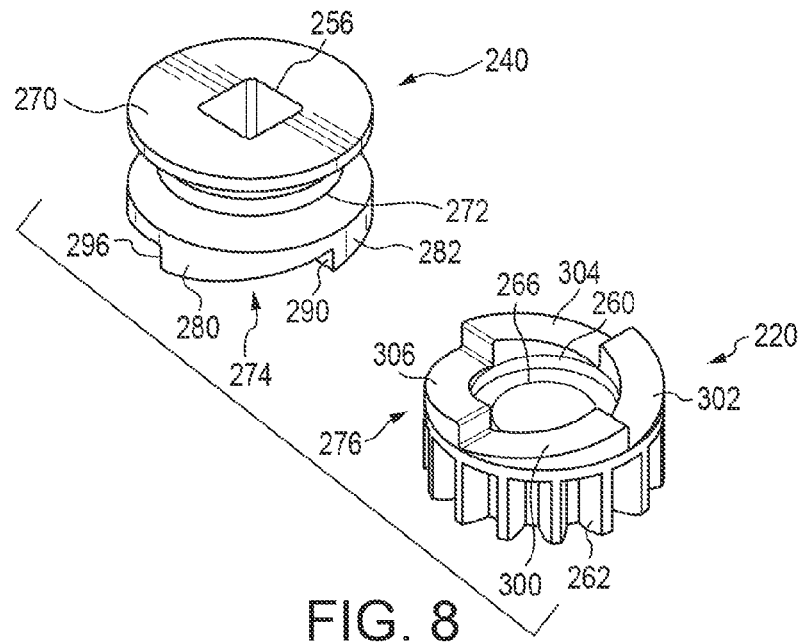
FIGS. 8-10 are views of a clutch of the clutch mechanism and a corresponding gear of the gear mechanism of the drive assembly of FIG. 4.
Figure 9:
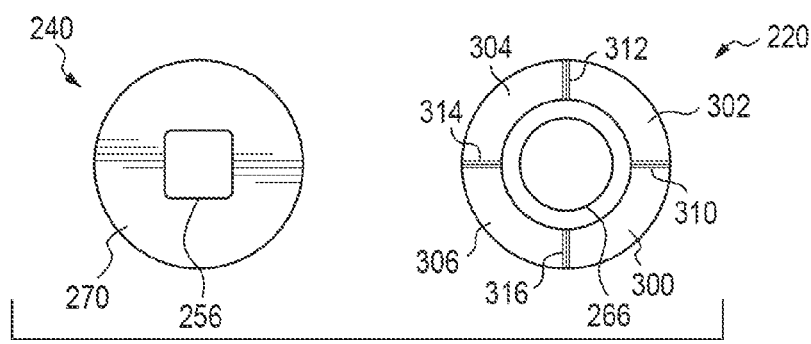
Figure 10:
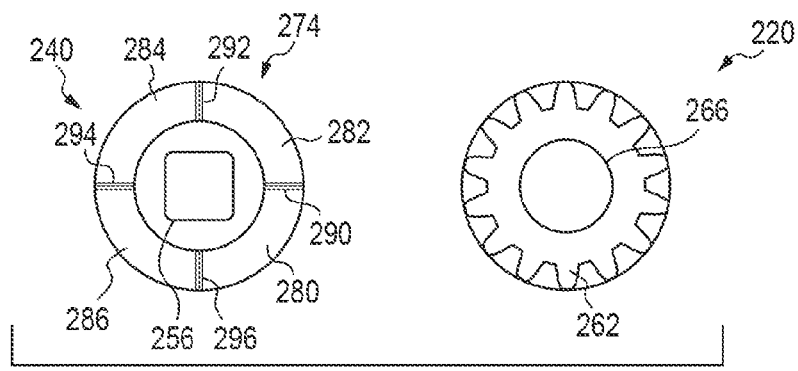

FIGS. 8-10 depict the exemplary features of the first gear 220 and the first clutch 240 according to one aspect of the present disclosure. As depicted, the first gear 220 includes a body 260 having radial teeth 262 spaced circumferentially about the body 260. The radial teeth 262 meshingly engage with radial teeth 264 (FIGS. 4 and 5) of the drive gear 224. A hole 266 extends through the body 260 and is sized to have the first end portion 244 of the first grinder shaft 246 extend therethrough. As indicated previously, the first gear 220 and the second gear 222 are in continuous contact with the drive gear 224. With this arrangement, having the first grinder shaft 246 in engagement with the first gear 220 would cause rotation of the first grinder shaft 246 in the second operational state of the drive assembly 110. To prevent this from occurring, the hole 266 of the first gear 220 is sized larger than an outer dimension of the first grinder shaft 246 so that rotation of the first gear 220 in the second operational state of the drive assembly 110 does not actuate the first grinding mechanism 196.

The first clutch 240 includes a body 270 having the opening 256 extending therethrough. Provided on the body 270 is a circumferential groove 272 and a first engagement face 274 configured to selectively engage a corresponding engagement face 276 of the body 260 of the first gear 220. In the exemplary embodiment, the first engagement face 274 of the first clutch 240 is defined by at least arcuate ramps 280, 282 which are serially arranged equal distance about a rotational axes of the first clutch 240 and the corresponding engagement face 276 of the first gear 220 is shaped to matingly engage the at least two ramps 280, 282 when the gear mechanism 190 (i.e., drive assembly 110) is in the first operational state. As shown, the first engagement face 274 includes four serially arranged arcuate ramps 280, 282, 284, 286, which operate as and can be referred to as axial teeth. Each arcuate ramp 280, 282, 284, 286 includes a respective engagement face 290, 292, 294, 296, and each engagement face separates the two adjacent ramps. For example, engagement face 290 separates ramp 280 from ramp 282. The corresponding engagement face 276 of the first gear 220 includes ramps 300, 302, 304, 306, which can also operate as and can be referred to as axial teeth, having respective engagement faces 310, 312, 314, 316. In the depicted embodiment, each of the first engagement face 274 of the first clutch 240 and the corresponding engagement face 276 of the first gear 220 is ratchet-shaped. It should be appreciated that the second gear 222 and the second clutch 242 have a configuration identical to the first gear 220 and the first clutch 240. Particularly, the second clutch 242 includes a second engagement face 324 configured to selectively engage a corresponding engagement face 326 of the second gear 222. As shown in FIG. 4, the second engagement face 324 is defined by at least arcuate ramps 330, 332 which are serially arranged equal distance about a rotational axes of the second clutch 242 and the corresponding engagement face 326 of the second gear 222 is shaped to mainly engage the at least two ramps when the gear mechanism 190 is in the second operational state. Again, according to one aspect, each of the second engagement face 324 of the second clutch 242 and the corresponding engagement face 326 of the second gear 222 is ratchet-shaped.

In the first operational state wherein the first clutch 240 is engaged to the first gear 220 of the gear mechanism 190, the engagement faces 290-296 of the first clutch 240 selectively engage the engagement faces 310-316 of the first gear 220. This, in turn, couples the first gear 220 to the first clutch 240 so that rotation of the first gear 220 in the first direction via the drive gear 226 causes rotation of the first clutch 240. However, it should be appreciated that with the shape of the ramps 280-286 and ramps 300-306 rotation of the first gear 220 in the second direction via the drive gear 226 can cause slippage between the engagement faces 274, 276 thereby preventing actuation of the first grinding mechanism 196. Therefore, with this configuration of the first and second clutches 240, 242 and the first and second gears 220, 222 rotation of the cover part 114 in the first direction rotates the first grinding mechanism 196 when the gear mechanism 190 is in the first operational state and rotation of the cover part 114 in the first direction rotates the second grinding mechanism 198 when the gear mechanism 190 is in the second operational state. Rotation of the cover part 114 in the second direction does not actuate either of the first grinding mechanism 196 or the second grinding mechanism 198. It should be appreciated, however, that instead of the depicted configuration of the engagement faces 274, 276 of the first clutch 240 and first gear 220 and the engagement faces 324, 326 of the second clutch 242 and second gear 222 that each of the engagement faces can include spaced apart teeth which allows for positive engagement between the first gear 220 and the first clutch 240 and in either rotational direction of the cover part 114 in the first operational state and positive engagement between the second gear 222 and the second clutch 242 and in either rotational direction of the cover part 114 in the second operational state.

With reference back to FIGS. 4, 6 and 7, the clutch mechanism 192 further includes a rocker 340 connected to the selector 200 and each of the first and second clutches 240, 242. The rocker 340 includes a base member 342 having an opening 344 through which the main drive shaft 230 extends. The base member 342 is further provided with first and second side rails 346, 348. The first side rail 346 has a first end 350 engaged to the first clutch 240 and a second end 352 engaged to the second clutch 242. Particularly, according to one aspect, the first end 350 includes a projection 356 which is sized to be received in the groove 272 of the first clutch 240, and the second end 352 includes a projection 358 which is sized to be received in a groove 360 of the second clutch 242. Similarly, the second side rail 348 includes a first end 364 and a second end 362. The first end 364 includes a projection 366 sized to be received in the groove 272 and the second end 362 includes a projection 368 sized to be received in the groove 360. The rocker 340 further includes a pair of spaced fingers 370, 372 extending outwardly from the base member 342, the fingers being connected to the selector 200. To allow for the selective engagement between the first and second clutches 240, 242 and the first and second gears 220, 222 depending on the operational state of the gear mechanism 190, the base member 342 can be pivotally connected to the lower housing part 212. In the illustrated embodiment, the lower housing part 212 is provided with a pair of supports 380, 382 extending upwardly toward the selector 200 and an end portion 384, 386 of each respective support 380, 382 is arcuate-shaped. The first side rail 346 of the rocker 340 includes a cylindrical-shaped tab 390 and the second side rail 348 includes a cylindrical-shaped tab 392. The tabs 390, 392 are supported on the respective end portions 384, 386 of the supports 380, 382. The tabs 390, 392 further define the pivot axis for the rocker 340.

As indicated previously, the selector 200 is moveable between a first position and a second position. In the first position of the selector 200 the first clutch 240 is engaged to the first gear 220. In the second position of the selector 200 the second clutch 242 is engaged to the second gear 222. According to one aspect, the first clutch 240 is only engaged to the first gear 220 in the first position and the second clutch 242 is only engaged to the second gear 222 in the second position. In the depicted embodiment, the selector 200 is connected to the rocker 340 and is moveable in a direction transverse to the longitudinal axes of the first and second containers 160, 162 between the first position and the second position. To allow for this connection between the selector 200 and the rocker 340, the selector includes a body 400 having opposed end walls 402, 404. Each end wall 402, 404 is provided with a cutout 406, 408 sized to receive one of the fingers 370, 372. The cutouts 406, 408 are also sized to allow the respective fingers 370, 372 to slide and/or pivot therein as the selector 200 is moved between the first position and the second position. With reference back to FIG. 3, the inner part 120 of the body 102 includes a housing 410 adapted to slidingly receive the selector 200. In the illustrated embodiment, the housing 410 is at least partially defined by the first wall 122 and second wall 124 and further includes an upper wall 412 and a lower wall 414. Each of the first wall 122 and the second wall 124 is provided with a tab (only tab 420 located on second wall 124 is shown). The tabs of the first and second walls 122, 124 selectively engage with corresponding tabs 426, 428 located on the respective end walls 402, 404 as the selector 200 is moved between the first position and the second position. This arrangement of the tabs provides a user with a positive indication that the selector 200 is in one of the first position and the second position and also prevents the selector 200 from inadvertently moving from one of the first position and second position to the other of the first position and second position during use of the spice mill 100. As shown in FIG. 2, buttons 430, 432 can be connected to opposite ends 434, 436 of the selector 200. The buttons 430, 432 are received in corresponding openings 440, 442 located on the body 102.

Figure 11:
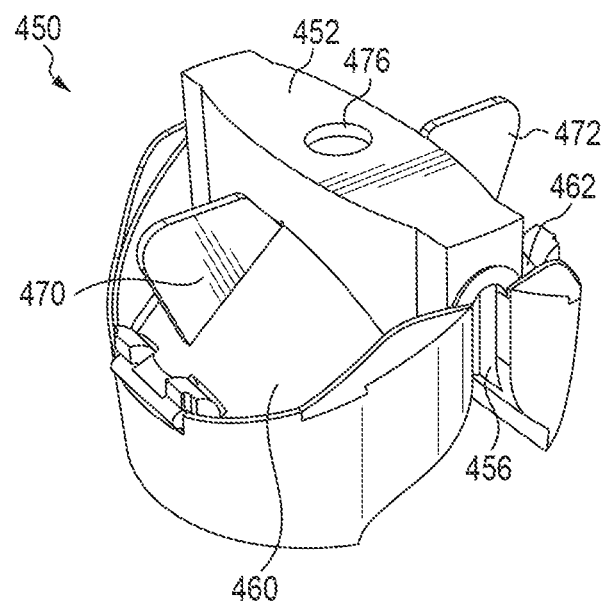
FIG. 11 is a perspective view of a funnel of the exemplary spice mill having first and second covers in a closed position.
Figure 12:
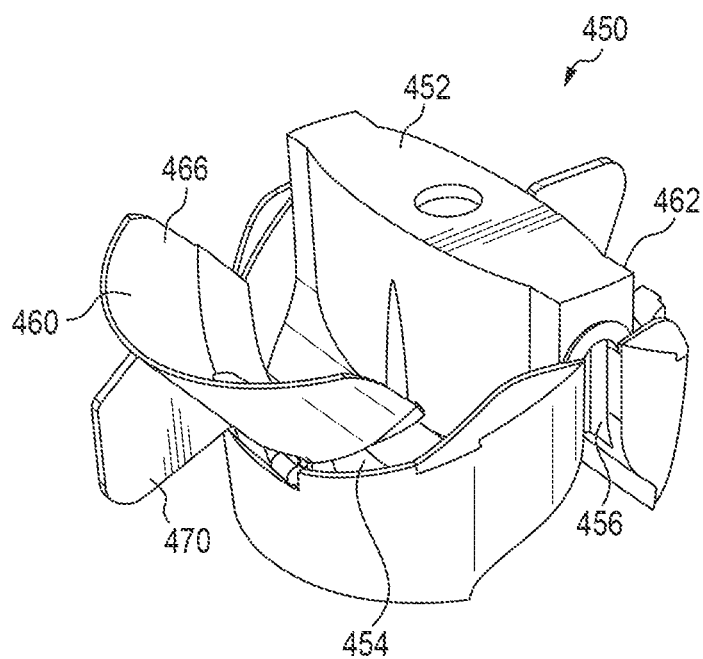
FIG. 12 is a perspective view of the funnel of FIG. 11 with one of the first and second covers in an open position.

With reference to FIGS. 2, 11 and 12, a funnel 450 covers the open end of both the first container 160 and the second container 162. The funnel 450 is housed by the cover part 114 and includes a body 452 having a first passage 454 in communication with the first container 162 and a separate second passage 456 in communication with the second container 162. The funnel 450 further includes a first cover 460 pivotally connected to the body 452 for covering the first passage 454. A second cover 462 is pivotally connected to the body 452 for covering the second passage 456. According to one aspect, each of the first and second covers 460, 462 has an arcuate-shaped inner surface (only inner surface 466 of the first cover 460 is depicted). In an open position of each of the first and second covers 460, 462, the respective inner surface of that cover directs a first spice into the first container 160 and a second spice into the second container 162. Each of the first and second covers 460, 462 can include a gripping member 470, 472 to facilitate movement of that cover from its closed position to its open position. The body 452 can further include an opening 476 through which the main drive shaft 230 extends for connection to the cover part 114.

Figure 14:
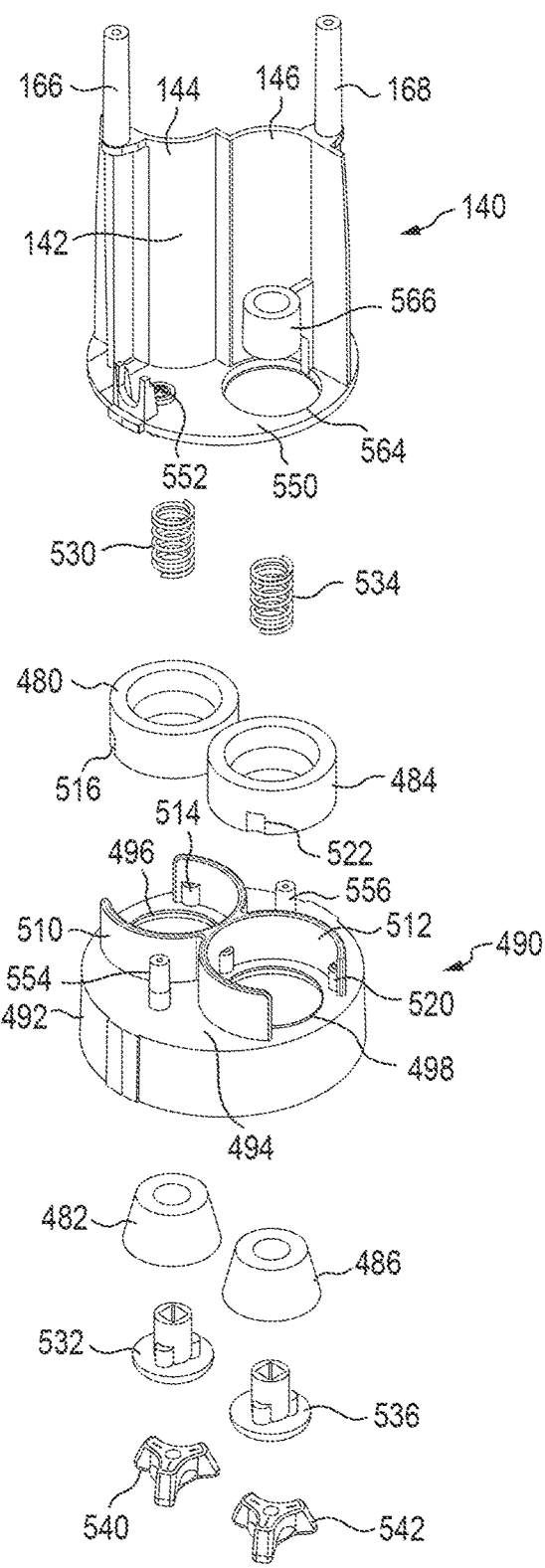
FIG. 14 is an exploded view of FIG. 13.

With reference now to FIGS. 13 and 14, as indicated previously, the grinding assembly 112 includes the first grinding mechanism 196 and the second grinding mechanism 198. The first grinding mechanism 196 includes a ring-shaped grinder 480 and a secondary conical-shaped grinder 482 to be positioned inside the grinder 480. Similarly, the second grinding mechanism 198 includes a ring-shaped grinder 484 and a secondary conical-shaped grinder 486 to be positioned inside the grinder 484. Each of the grinders 480, 484 is supported on a grinder holder 490. In the depicted embodiment, the grinder holder 490 includes a body 492 having a top surface 494 with a pair of openings 496, 498. A first shoulder 510 at least partially surrounds the opening 496 and a second shoulder 512 at least partially surrounds the opening 498. The first shoulder 510 is provided with at least one protuberance 514 to be received in at least one groove 516 located on the grinder 480. This prevents rotation of the grinder 480 on the grinder holder 490. Similarly, the second shoulder 512 includes at least one protuberance 520 to be received in at least one corresponding groove 522 located on the grinder 484. Again, engagement of the protuberance 520 in the groove 522 prevents rotation of the grinder 484 on the grinder holder 490. With reference back to FIG. 2, the first grinder shaft extends through a spring 530 and each of the grinders 480, 482 and is connected to a grommet 532. Similarly, the second grinder shaft 252 extends through a spring 534 and each of the grinders 484, 486 and is connected to a grommet 536. Nuts 540, 542 secure the respective grommets 532, 536 to the ends of the first and second grinder shafts 246, 252. Mounted atop the grinder holder 490 is the partition 140. The partition includes a base 550 having openings (only opening 552 is shown) which are aligned with bosses 554, 556 located on the top surface 494. Fasteners 560 extend through the openings 552 and threadingly engage the bosses 554, 556. The base 550 is further provided with holes on either side of the dividing wall 142 (only hole 564 is depicted) which are aligned with the grinders 480, 484. To provide support to the first and second grinder shafts 246, 252 support members are located on the dividing wall 142 (only support member 566 is depicted) through which the grinder shafts can extend.

As is evident from the foregoing, in the first operational state of the drive assembly 110, the selector 200 is in the first position which pivots the first clutch 240 into engagement with the first gear 220 via the rocker 340. Rotation of the cover part 114 rotates the drive gear 224 which in turn simultaneously rotates the first and second gears 220, 222. The engagement between the first clutch 240 and the first gear 220 causes rotation of the first grinder shaft 246 and the grinder 482 connected to the end portion thereof. With the grinder 482 rotating within the grinder 480, any spice in the first container 160 caught there between is milled by the first grinding mechanism 196. Similarly, in the second operational state of the drive assembly 110, the selector 200 is in the second position which pivots the second clutch 242 into engagement with the second gear 222 via the rocker 340. Rotation of the cover part 114 rotates the drive gear 224 which in turn simultaneously rotates the first and second gears 220, 222. The engagement between the second clutch 242 and the second gear 222 causes rotation of the second grinder shaft 252 and the grinder 486 connected to the end portion thereof. With the grinder 486 rotating within the grinder 484, any spice in the second container 162 caught there between is milled by the second grinding mechanism 198.

Figure 15:
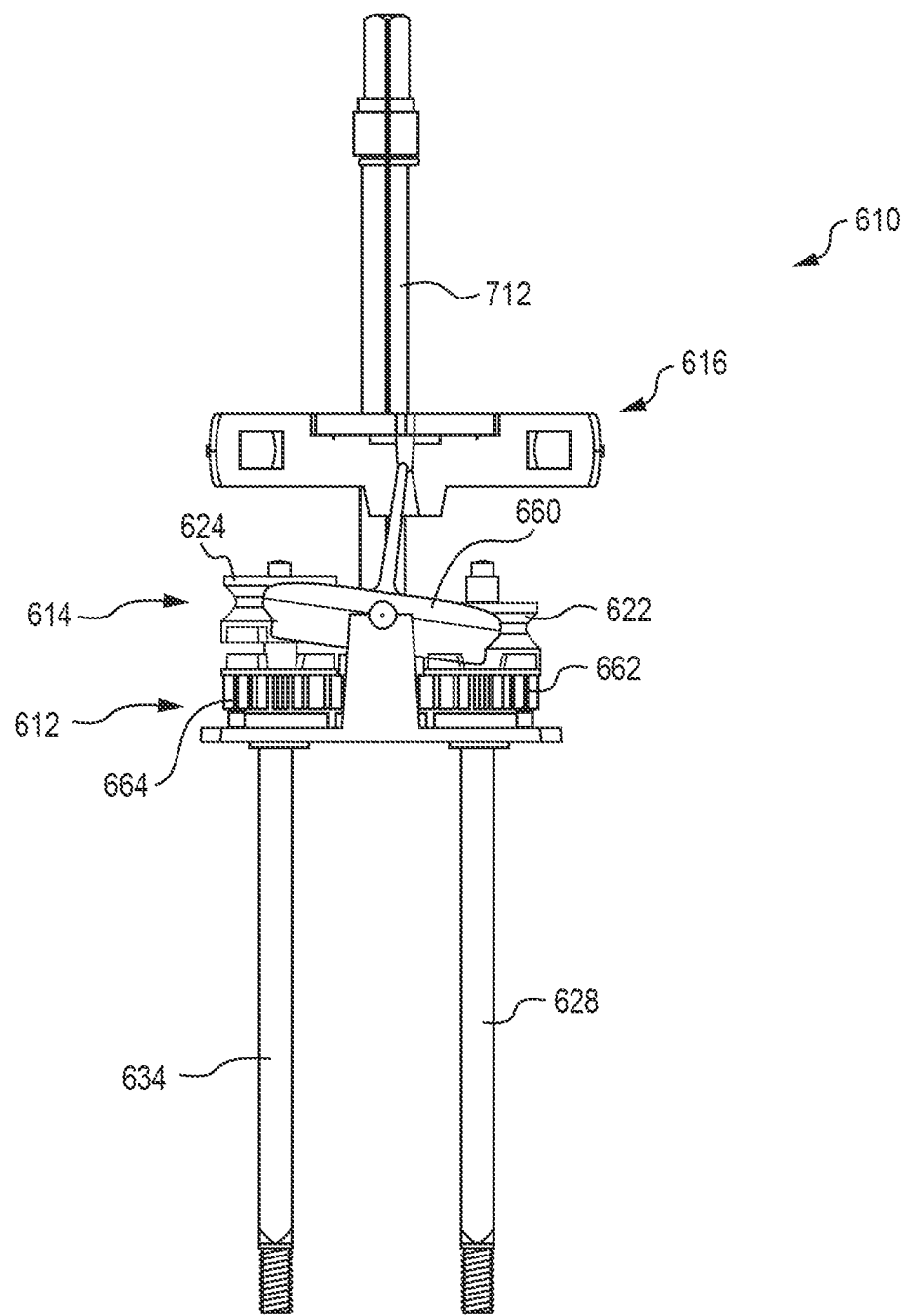
FIG. 15 is an elevation view of an alternative drive assembly having an alternative clutch mechanism and gear mechanism from that shown in FIG. 5.

FIG. 15 depicts an alternative drive assembly 610 that could be used instead of the drive assembly 110 described above and depicted in FIG. 2. The drive assembly 610 includes a gear mechanism 612 that would also be arranged near an upper end of the first and second containers 160, 162 shown in FIG. 3. The drive assembly 610 includes the gear mechanism 612 and a clutch mechanism 614. The gear mechanism 612 and the clutch mechanism 614 are similar to the gear mechanism 190 and the clutch mechanism 192 described above. The manner in which the clutch mechanism 614 engages the gear mechanism 612 is different, which allows for rotation of the cover part 114 (FIG. 2) in either a first direction or a second direction to drive the grinding mechanisms 196, 198 (FIG. 4). The gear mechanism 612 is selectively operable in one of a first operational state and a second operational state, and these states are the same as those described above with regard to the gear mechanism 190. A selector 616, which operates in a similar manner to the selector 200 described above, connects with the gear mechanism 612 and is moveable (slidable) between a first position and a second position. In the first position of the selector 616, the gear mechanism 612 is operable in the first operational state and in the second position of the selector 616, the gear mechanism 612 is operable in the second operational state in a similar manner to the selector 200 and gear mechanism 190 described above.

Figure 16:
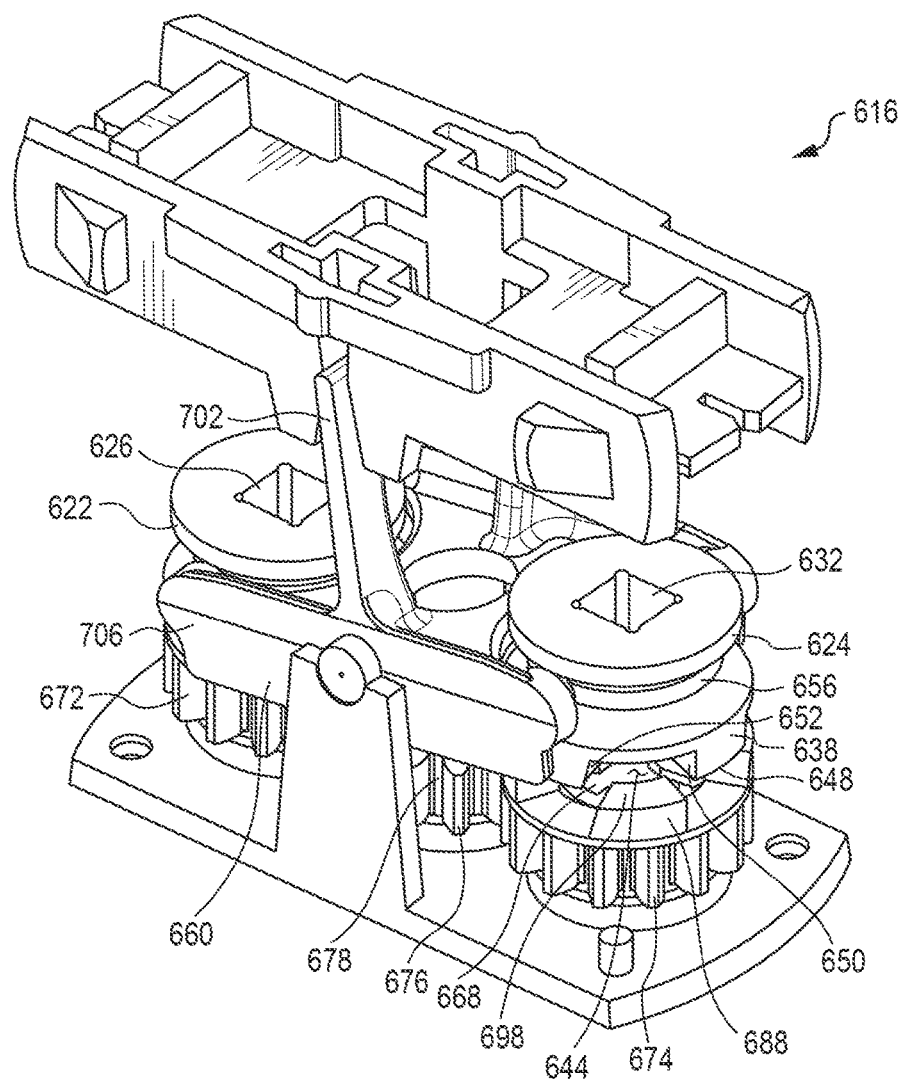
FIGS. 16 and 17 are perspective views of the clutch mechanism, drive mechanism and a selector of the drive assembly shown in FIG. 15.

The clutch mechanism 614 includes a first clutch 622 and a second clutch 624. With reference to FIG. 16, the first clutch 622 includes an opening 626 for receiving a first grinder shaft 628 (FIG. 15), which is similar to the first grinder shaft 246 described above, in a manner that allows the first clutch 622 to slide on and with respect to the first grinder shaft. The second clutch 624 also includes an opening 632 for receiving a second grinder shaft 634, which is similar to the second grinder shaft 252 described above, in a manner that allows the second clutch 624 to slide on and with respect to the second grinder shaft. Different than the clutches 240, 242 (FIG. 6) described above, each of the clutches 622, 624 includes castellated teeth 636, 638, respectively. The castellated teeth 636, 638 project in a direction parallel to a rotational axis of the clutches. Notches 642, 644, respectively, are provided between adjacent castellated teeth 636, 638, which allow for the clutches 622, 624 to selectively engage the gear mechanism 612. The castellated teeth 636, 638 on each clutch 622, 624 terminate in a lower planar surface 646, 648. Each lower planar surface 646, 648 is normal to the rotational axes of the clutches 622, 624. Each castellated tooth also includes a first side surface that is more vertically oriented than a second side surface. With reference to the second clutch 624 in FIG. 16, the first side surface 650 of each castellated tooth 638 is aligned with a plane radiating from a rotational axis of the second clutch, and the second surface 652 of each castellated tooth 638 is aligned at an obtuse angle with respect to a plane normal to the rotational axis of the second clutch 624. The castellated teeth 636 on the first clutch 622 are similarly shaped. The first clutch 622 also includes a circumferential groove 654 and the second clutch 624 includes a similar circumferential groove 656, which allows the selector 616 to connect with the clutches 622, 624 through a rocker 660, which will be described in more detail below.

The gear mechanism 612 includes a first gear 662 and a second gear 664. With reference to FIG. 15, the first gear 662 includes an opening (not visible) for receiving the first grinder shaft 628 (FIG. 15) similar to the first gear 220 (FIG. 6) described above. The second gear 664 also includes an opening 668 (FIG. 16) for receiving the second grinder shaft 634 similar to the second gear 222 described above. The first gear 662 includes radial teeth 672 and the second gear 664 also includes radial teeth 674. The radial teeth 672, 674 engage corresponding radial teeth 676 of a drive gear 678 in the same manner that the first gear 220 and the second gear 222 engage the drive gear 224. Different than the first gear 220 and the second gear 222 (FIG. 6) described above, each of the gear 662, 664 includes castellated teeth 686, 688, respectively, that project in a direction parallel to a rotational axis of the gears 662, 664. Notches 692, 694, respectively, are provided between adjacent teeth 686, 688, which allow the first gear 662 to selectively engage the first clutch 622 and the second gear 664 to selectively engage the second clutch 624. The castellated teeth 686, 688 on each gear 662, 664 terminate in an upper planar surface 696, 698. Each upper planar surface 696, 698 is normal to the rotational axis of the gears 662, 664. Similar to the castellated teeth on the clutch, each castellated tooth 686, 688 on the first gear 220 and the second gear 222, respectively, also includes a first side surface that is more vertically oriented than a second side surface. With reference to the first gear 662 in FIG. 17, the first side surface 690 of each castellated tooth 686 is aligned with a plane radiating from a rotational axis of the first gear, and the second surface 691 of each castellated tooth 686 is aligned at an obtuse angle with respect to a plane normal to the rotational axis of the first gear. The castellated teeth 688 on the second gear 664 are similarly shaped. The shape of the castellated teeth 636, 638, 686, 688 encourage the respective clutches 622, 624 to engage the respective gears 662, 664 when the respective clutch 622 or 624 is being rotated with respect to the respective gear 662, 664 while the planar surfaces 646, 648 and planar surfaces 696, 698 may be in contact with one another.

Figure 17:
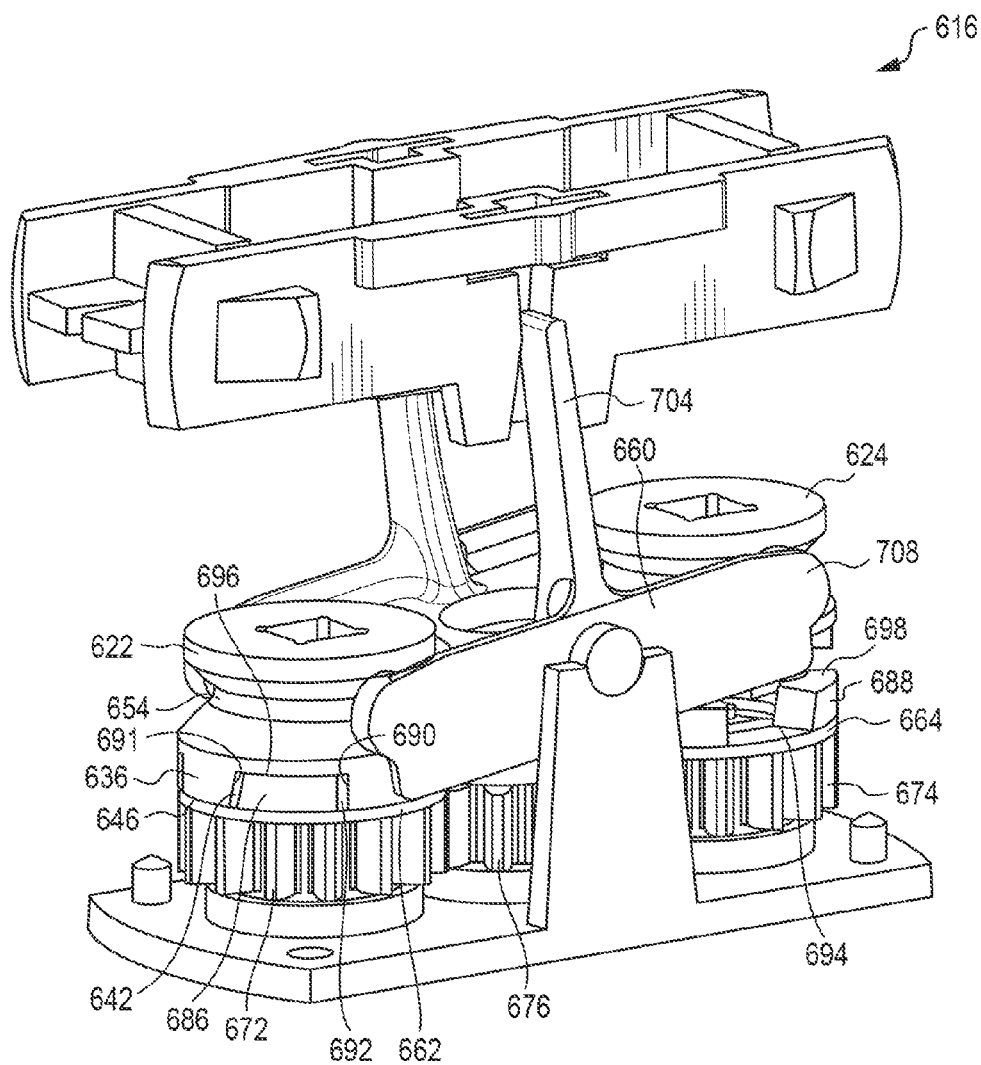

The rocker 660 is the same as the rocker 340 (FIG. 6) in all respects, with the exception of the fingers 702, 704. Therefore, only the differences between the rocker 660 and the rocker 340 will be described in detail. At least one of the fingers 702, 704 is made so as to flex or bend with respect to the side rails 706, 708. The fingers 702, 704 connect with the selector 616 and are configured to bias the first clutch 622 toward the first gear 662 when the selector 616 is in the first position. The fingers 702, 704 are also configured to bias the second clutch 624 toward the second gear 664 when the selector 616 is in the second position. When changing from the selector 616 in the first position (as shown in FIGS. 15-17) to the selector 616 being in the second position, the lower planar surfaces 648 of the castellated teeth 638 on the second clutch 624 may contact the upper planar surfaces 698 on the castellated teeth 688 on the second gear 664. After the selector 616 has been moved into the second position, an operator will typically rotate the cover part 114 (FIG. 2), which rotates a main shaft 712 connected with the drive gear 678. Rotation of the drive gear 678 results in rotation of the first gear 662 and the second gear 664. The flexing or bending of the fingers 702, 704 provides a downward force on the second clutch 624 so that when the second gear 664 is rotated with respect to the second clutch 624, which is not rotating yet, the castellated teeth 638 of the second clutch 624 can align with the notches 694 of the second gear 664. This allows the second clutch 624 to engage with the second gear 664 so that the second clutch 624 rotates with the second gear 664, which rotates the second grinder shaft 634. When the selector 616 is moved back to the first position, the fingers 704, 704 operate in a similar manner biasing the first clutch 622 toward the first gear 662.

Figure 18:
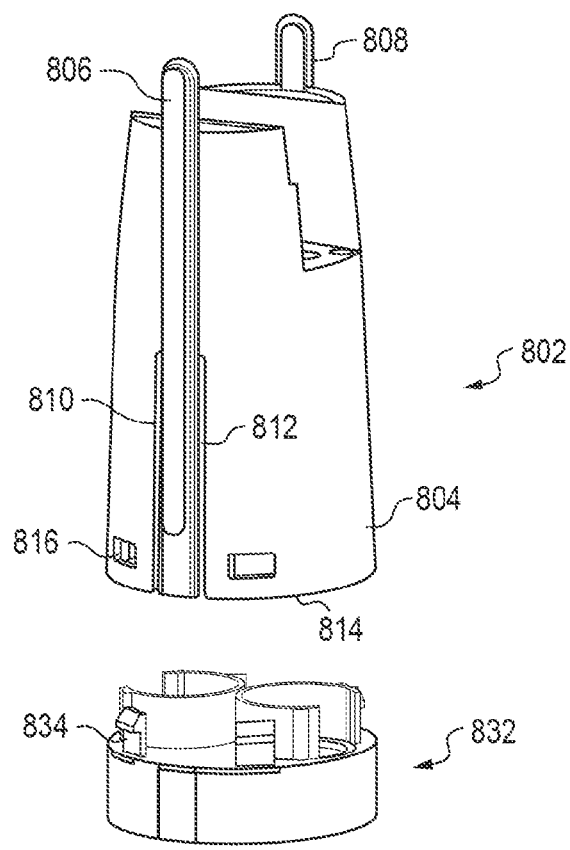
FIG. 18 is a perspective view of a window insert and an alternative grinder holder.
Figure 19:
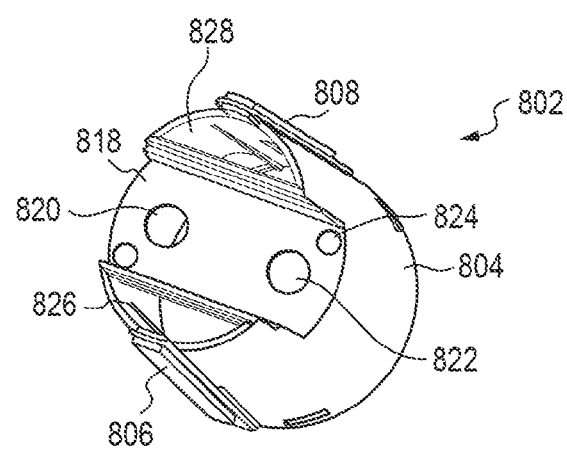
FIG. 19 is a perspective view of the window insert shown in FIG. 18.

FIGS. 18 and 19 depict a window insert 802 that can be received in the body 102 (FIG. 2). The window insert 802 includes a conical sidewall 804, which is complementary in shape although slightly smaller than the body 102 (FIG. 2), and windows 806, 808, which are similar in operation to the transparent inserts 184, 186 shown in FIG. 2. The windows 806, 808 allow an operator to view the first container 160 and the second container 162 (see FIG. 3). The windows 806, 808 are received in respective elongated slots 180, 182 shown in FIG. 2 when the window insert 802 is received inside the body 102.

The window insert 802 includes slots 810, 812 extending upwardly from a lower edge 814 of the window insert 802. The slots 810, 812 are positioned on opposite sides of the window 806. Similar slots (not visible) are positioned on opposite sides of the window 808. The slots 810, 812 facilitate insertion of the window insert 802 into the body 102 (FIG. 2) by allowing the lower section of the windows 806, 808 to flex inwardly until being fully received in the respective slots 180, 182. The window insert 802 further includes openings 816 formed near the lower edge 814.

With reference to FIG. 19, the window insert 802 further includes an intermediate support wall 818. The intermediate support wall 818 can support the gear mechanism 612, the clutch mechanism 614 and the selector 616 depicted in FIGS. 15-17. A first grinding shaft opening 820 and a second grinding shaft opening 822 are formed through the intermediate support wall 818. The first grinder shaft 246 (FIG. 2) or 628 (FIG. 15) is received through the first grinding shaft opening 820. The second grinder shaft 252 (FIG. 2) or 634 (FIG. 15) is received through the second grinding shaft opening 822. Fastener openings 824 are also provided in the intermediate support wall 818 to fix the gear mechanism 612 and the clutch mechanism 614 to the intermediate support wall 818. A first upper opening 826 is provided on one side of the window insert 802 and a second upper opening 828 is provided on an opposite side of the window insert 802. The first upper opening 826 leads to the first spice container, such as the first spice container 160 depicted in FIG. 3, and the second upper opening 828 leads to the second spice container, such as the second spice container 162 depicted in FIG. 3.

With reference back to FIG. 18, the window insert 802 attaches with a grinder holder 832, which is similar in all respects to the grinder holder 490 described above, with the exception of upwardly extending barbs 834. The upwardly extending barbs 834 are received in the openings 816 to attach the window insert 802 to the grinder holder 832.

It will be appreciated that various of the above-disclosed embodiments and other features and functions, or alternatives thereof, may be desirably. Also that various presently unforeseen or unanticipated alternatives, modifications, variations or improvements therein may be subsequently made by those skilled in the art which are also intended to be encompassed by the following claims.

What is claimed is:

1. A spice mill for crushing two different spices, the spice mill comprising:
   a body defining a first container and a separate second container;
   a first grinding mechanism housed in the body and arranged at a lower end of the first container;
   a second grinding mechanism housed in the body and arranged at a lower end of the second container;
   a drive assembly housed in the body and including a gear mechanism being selectively operable in one of a first operational state wherein the gear mechanism drives the first grinding mechanism and a second operational state wherein the gear mechanism drives the second grinding mechanism;
   a selector connected to the gear mechanism, the selector being movable between a first position and a second position, wherein in the first position of the selector the gear mechanism is operable in the first operational state and in the second position of the selector the gear mechanism is operable in the second operational state, wherein the selector is movable in a direction transverse to the longitudinal axes of the first and second containers between the first position and the second position; and
   a cover part rotatably mounted to the body and connected to the gear mechanism, wherein rotation of the cover part in a first direction rotates the first grinding mechanism when the gear mechanism is in the first operational state and rotation of the cover part in the first direction rotates the second grinding mechanism when the gear mechanism is in the second operational state.

2. The spice mill of claim 1, wherein rotation of the cover part in a second direction, which is opposite the first direction, rotates the first grinding mechanism when the gear mechanism is in the first operational state and rotation of the cover part in the second direction rotates the second grinding mechanism when the gear mechanism is in the second operational state.

3. The spice mill of claim 1, wherein the drive assembly is configured so that rotation of the cover part in a second direction does not actuate either the first grinding mechanism or the second grinding mechanism.

4. The spice mill of claim 1, wherein the second container is located next to the first container such that a longitudinal axis defined by the second container is offset from and parallel to a longitudinal axis defined by the first container.

5. The spice mill of claim 1, wherein the drive assembly further includes a clutch mechanism coupled to the selector, the clutch mechanism having a first clutch connected to a first grinder shaft of the first grinding mechanism and a second clutch connected to a second grinder shaft of the second grinding mechanism, wherein in the first position of the selector the first clutch is engaged to the gear mechanism and in the second position of the selector the second clutch is engaged to the gear mechanism.

6. The spice mill of claim 5, wherein the gear mechanism includes a first gear and a second gear, and the first clutch is configured to selectively engage with the first gear and the second clutch is configured to selectively engage with the second gear.

7. The spice mill of claim 6, wherein each clutch and each gear include ratchet-shaped teeth.

8. The spice mill of claim 6, wherein each clutch and each gear include castellated teeth.

9. The spice mill of claim 6, wherein each clutch includes teeth terminating in a lower planar surface and each gear includes teeth terminating in an upper planar surface.

10. The spice mill of claim 6, wherein the clutch mechanism further includes a rocker connected to the selector, the first clutch and the second clutch, wherein movement of the selector toward the first position moves the first clutch toward engagement with the first gear and movement of the selector toward the second position moves the second clutch toward engagement with the second gear.

11. The spice mill of claim 10, wherein the rocker includes a base member and a finger projecting from the base member, the base member being pivotally connected to a housing supporting the gear mechanism in the body, the base member having a first end engaged to the first clutch and a second end engaged to the second clutch, the finger extending from the base member and being connected to the selector.

12. The spice mill of claim 11, wherein the finger is configured to bias the first clutch toward the first gear when the selector is in the first position, and the finger is configured to bias the second clutch toward the second gear when the selector is in the second position.

13. The spice mill of claim 6, wherein each clutch includes an opening, wherein the first clutch receives the first grinder shaft in the opening in the first clutch such that the first clutch is slidable along the first grinder shaft, wherein the second clutch receives the second grinder shaft in the opening in the second clutch such that the second clutch is slidable along the second grinder shaft.

14. The spice mill of claim 6, wherein the gear mechanism further includes a drive gear which at all times is operably engaged to both the first gear and second gear, wherein rotation of the cover part rotates the drive gear, rotation of the drive gear simultaneously rotating each of the first gear and the second gear.

15. The spice mill of claim 1, further including a funnel for covering the end of both the first container and the second container, the funnel being housed by the cover part and including a body having a first passage in communication with the first container and a separate second passage in communication with the second container, wherein the funnel includes a first cover pivotally connected to the body for covering the first passage and a second cover pivotally connected to the body for covering the second passage, each of the first and second covers having an arcuate shaped inner surface, wherein in an open position of each of the first and second covers the respective inner surface of that cover directs a first associated spice into the first container and a second associated spice into the second container.

16. The spice mill of claim 1, further comprising a window insert received in the body and including a window to allow an operator to view the first container and the second container.

17. A drive assembly for a spice mill having a first grinding mechanism for crushing a first spice contained in a first container of the spice mill and a second grinding mechanism for crushing a second spice contained in a second separate container of the spice mill, the drive assembly comprising:

a clutch mechanism including a first clutch having an opening therethrough for slidably receiving a first grinder shaft of the first grinding mechanism and a second clutch having an opening therethrough for slidably receiving a second grinder shaft of the second grinding mechanism; and a gear mechanism including a first gear, a second gear, and a drive gear which at all times is operably engaged to both the first gear and second gear so that rotation of the drive gear rotates both the first gear and the second gear, the gear mechanism being selectively operable in one of a first operational state wherein the first clutch is engaged to the first gear so that rotation of the drive gear only actuates the first grinding mechanism and a second operational state wherein the second clutch is engaged to the second gear so that rotation of the drive gear only actuates the second grinding mechanism, wherein the clutch mechanism further includes a rocker connected to the first clutch and the second clutch, and a selector connected to the rocker, the selector being movable between a first position and a second position, wherein with the selector in the first position the first clutch engages with the first gear and with the selector in the second position the second clutch engages with the second gear.

18. The drive assembly of claim 17, wherein the selector is slidable between the first position and the second position.

19. The drive assembly of claim 18, wherein the rocker includes a base member and a finger projecting from the base member, the base member being pivotally connected to a housing supporting the gear mechanism, the base member having a first end engaged to the first clutch and a second end engaged to the second clutch, the finger extending from the base member and being connected to the selector, and wherein the finger is configured to bias the first clutch toward the first gear when the selector is in the first position, and the finger is configured to bias the second clutch toward the second gear when the selector is in the second position.

* * * * *